United States Patent [19]
Dill

[11] 3,724,549
[45] Apr. 3, 1973

[54] OIL SOLUBLE DIVERTING MATERIAL AND METHOD OF USE FOR WELL TREATMENT

[75] Inventor: Walter R. Dill, Duncan, Okla.

[73] Assignee: Halliburton Company, Duncan, Okla.

[22] Filed: Feb. 1, 1971

[21] Appl. No.: 111,387

[52] U.S. Cl..................166/282, 166/281, 166/283, 166/294, 166/295
[51] Int. Cl......................E21b 33/138, E21b 43/27
[58] Field of Search......166/282, 283, 280, 281, 295, 166/294, 307, 308

[56] References Cited

UNITED STATES PATENTS

| | | |
|---|---|---|
| 3,319,716 | 5/1967 | Dill......................................166/282 |
| 3,316,965 | 5/1967 | Watanabe.........................166/281 X |
| 3,173,484 | 3/1965 | Huitt et al. ............................166/280 |
| 3,302,719 | 2/1967 | Fischer.................................166/280 |
| 3,370,650 | 2/1968 | Watanabe..............................166/280 |
| 3,601,194 | 8/1971 | Gallus..................................166/282 |

Primary Examiner—Stephen J. Novosad
Attorney—John H. Tregoning

[57] ABSTRACT

The present invention relates to an oil soluble bridging agent for diverting oil well treating fluids to less permeable portions of an oil-producing subterranean formation having temperatures up to about 360°F.

17 Claims, 1 Drawing Figure

PARTICLE SIZE DISTRIBUTION FOR HIGH TEMPERATURE, OIL SOLUBLE DIVERTING AGENT

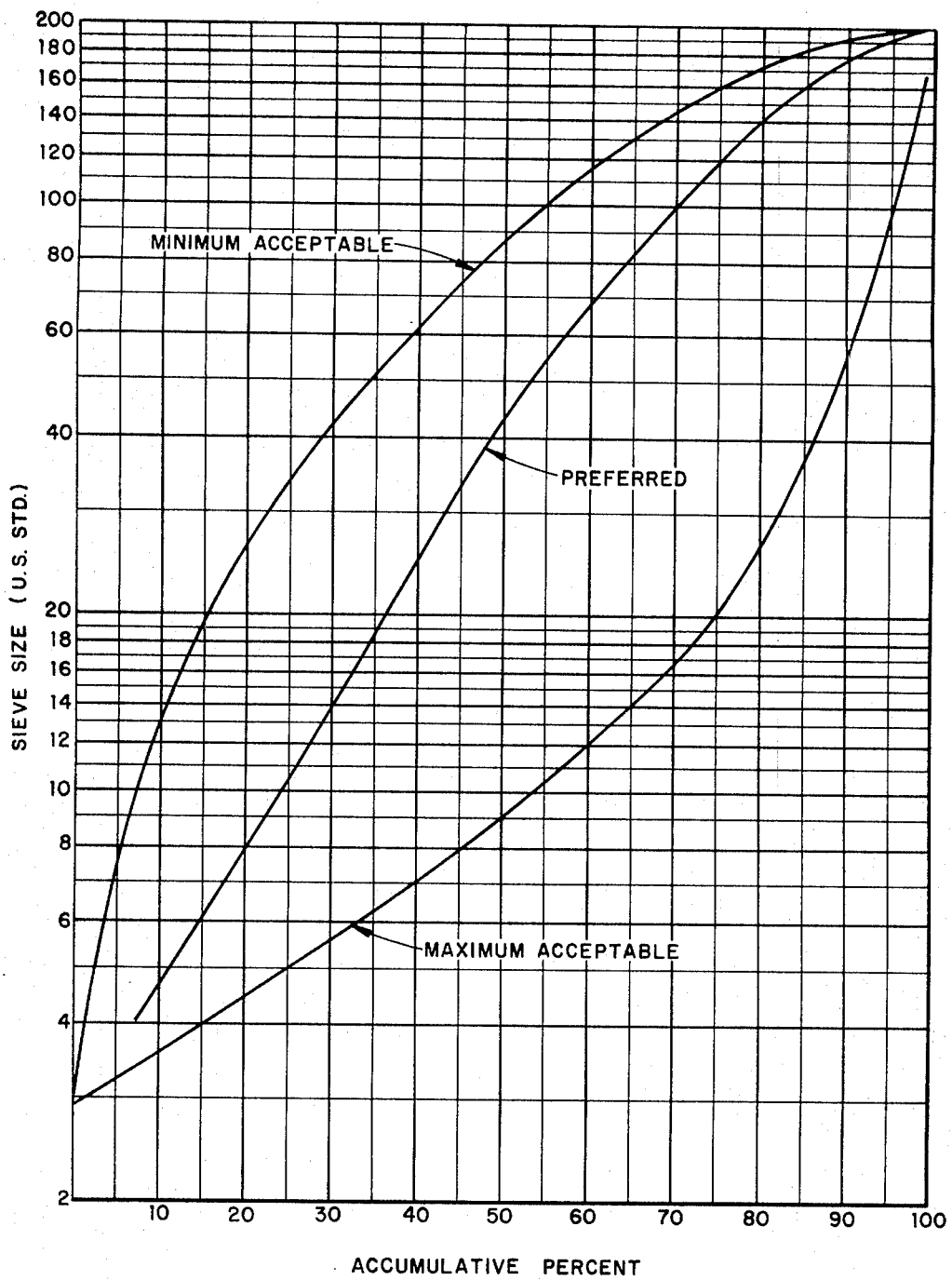
PARTICLE SIZE DISTRIBUTION FOR HIGH
TEMPERATURE, OIL SOLUBLE DIVERTING AGENT

OIL SOLUBLE DIVERTING MATERIAL AND METHOD OF USE FOR WELL TREATMENT

The present invention relates to a diverting material for blocking portions of a subterranean formation penetrated by a well bore whereby treating liquids are diverted to other portions of said formation.

Throughout the following disclosure, illustrative examples, and appended claims, the phrases "bridging agent" and "diverting agent" are employed many times. These two phrases are used interchangeably and each one defines and otherwise generally refers to an agent which functions to prevent the flow of liquid into a particular location, usually located in a subterranean formation, whereby the agent "bridges" on the particular location to seal the location and thereby cause the liquid to "divert" to a different location.

In the treatment of subterranean formations with liquids for workover operation of stimulation, it is often desirable to divert the treating fluid from highly permeable portions of the formation into less permeable portions of said formation. In the past, this has been primarily accomplished by pumping a volume of treating fluid, following it with a diverting material (bridging agent in a carrier fluid), to seal off the portion of said formation where the first treating fluid penetrated and then following the diverting material with a second stage of treating liquid which would be forced into another portion of said formation. The carrier liquid containing the bridging agent flows most readily into the portion of the formation having the largest pores, fissures and vugs until that portion is bridged and sealed, thus diverting the remaining fluid to the next permeable portion of the formation. These steps may be repeated until the desired number of stages of treating fluid has been pumped.

The bridging agent may be dispersed in the treating fluid for progressive diversion throughout the treating operation. AFter the treatment, the bridging material agent must be removed to allow flow of the oil. This is usually accomplished by selecting bridging agents that will dissolve in formation fluids or treating fluids or bridging agents which will melt or sublime at formation temperatures. However, some diverting agents require a separate flush of the treated well with a fluid which will wash them from the formation.

A great variety of bridging agents has been used to plug formation openings and to divert treating liquids to other zones of the formation. For example, wax beads have been used as diverting agents. However, the wax beads have been found to have melting points from about 140°F to about 190°F, making them useless if the formation temperature exceeds their melting point. It has also been found that wax beads, upon melting, will sometimes solidify the formation oil in which they dissolve unless they are present in the oil in concentrations of less than about one pound per gallon of oil.

Napthalene particles have also been used as diverting agents. Napthalene is readily soluble in oil, melts at about 180°F, and sublimes at elevated temperatures, making it suitable only for applications at lower formation temperatures.

Benzoic acid particles which are slowly soluble in oil and aqueous fluids also have been used as diverting agents. Benzoic acid has a melting point of about 250°F and sublimes at elevated temperatures. The particle size distribution of this material and its melting point limits its application. Its 250°F melting point limits its usefulness to formations having temperatures of below about 250°F.

Sodium chloride, which has a melting point of about 1,470°F, has been used as a diverting agent. Sodium chloride is not oil soluble and requires that the well be cleaned with water or dilute acid after the formation has been treated if the salt is not dissolved by produced formation water or water in the treating fluids. An additional disadvantage is that the sodium chloride cannot be used with hydrofluoric acid to treat wells because of the insoluble precipitates formed.

Additionally, oil wells have been treated using grain blends as bridging agents. Typical grains used are corn, milo, millet and peas. These grains, when used as diverting agents are difficult to remove from the formation and often require that the formation sought to be treated be charged with nitrogen under great pressure before such diverting agents are used. The nitrogen blows the diverting agents from the formation openings when the wellhead pressure is released after the treatment.

The FIGURE shows the range of resin particle size distribution useful in the present invention.

The present invention provides a diverting material for diverting aqueous treating liquids, including acids, into progressively less permeable portions of subterranean formations, which comprises a carrier liquid and graded particles of cyclic or linear hydrocarbon resins having between about 20 and about 1,400 carbon atoms, said resin having a melting point of at least about 200°F and being oil soluble. The invention provides a bridging agent which will withstand high formation temperatures and which will be dissolved out of the formation by the produced oil, thus eliminating the need to flush the bridging agent from the formation. The invention provides a bridging agent which is compatible with acid solutions including hydrofluoric acid solutions.

One component of the diverting material of the present invention is a cyclic or linear hydrocarbon resin having a carbon chain of from about 20 to about 1,400 and having a melting point exceeding 200°F. Such hydrocarbon resins having a carbon chain of less than about 20 are liquid or are soft and will not operate to plug formations. Further, such resins having a carbon chain of less than about 20 are too soft to be ground into graded particular form and tend to remass if particulated.

Cyclic and linear hydrocarbon resins having a carbon chain greater than about 1,400 are usually not soluble in hydrocarbon liquids and are therefore not useful in the present invention. The preferred carbon chain length is about 700 carbon atoms.

If the resin has a melting point of less than about 200°F, particles will remass.

Useful resins, therefore, are alkyl aromatic resins, petroleum hydrocarbon resins such as indene-methyl indene polymers, pentaerythritol ester of polymerized rosin and pentaerythritol ester of dimeric resin acids. Although other straight chain and cyclic hydrocarbon resins may be useful in the present invention, those listed above are preferred. The preferred alkyl aromatic resin is dicyclopentadiene.

Useful resins are available commercially from the Pennsylvania Industrial Chemical Corporation under the tradenames Inkovar AB-180 and Inkovar AB-165 and from the Hercules Chemical Company under the tradenames Pentalyn H, Pentalyn K, and Dymerex.

To be useful in the present invention, it is required that the resin be present in graded particles. The purpose of the particles in the carrier fluids is to seal off portions of an earth formation by blocking off the fissures, pores and vugs which grant access to the formation from the well bore penetrating the formation. It has been discovered that particles of a uniform size may bridge on a zone but do not always operate to stop the flow into the zone. However, it has been found that particles of a graded size will operate to bridge and seal the zone, making it incapable of accepting a fluid.

The particle size of the resin may be graded from about 3 mesh to about 200 mesh (U.S. Sieve Series). The particle size distribution of the graded particular resin is important. Any given sample of a useful resin having an acceptable particle size distribution should have an accumulative percentage of resins of various mesh sizes, starting with the smallest mesh sizes, within the following limits: On a 4 mesh sieve, between about 1% and about 15%; on a 10 mesh sieve, between about 8% and about 55%; on a 20 mesh sieve, between about 15% and about 75%; on a 40 mesh sieve, between about 28% and about 86%; on an 80 mesh sieve, between about 47% and about 93%; on a 140 mesh sieve, between about 68% and about 98%; and on a 180 mesh sieve, between about 82% and about 99% (see FIG. 1).

It is preferred that the particle size of the resin be graded from about 4 mesh to about 170 mesh. In its most preferred form, the resin particles should be present in about 7 percent by weight on a size 4 mesh sieve and about 12 percent by weight through a size 170 mesh sieve with the balance of the particles having various sizes between about 4 mesh and about 170 mesh. Although some plugging will be accomplished by other distributions of particle sizes, the most preferred distribution, described above, will give the best sealing.

The bridging agent should be present in the carrier liquid in concentrations of from about 0.12 pound per gallon to about three pounds per gallon, the most preferred concentrations of diverting agent being from about 0.25 to about one pound per gallon of carrying fluid.

Bridging agent concentrations of less than about 0.12 pound per gallon will not plug formations when used in carrying fluid volumes which are normally available at an oil well site. A prohibitively large volume of carrying fluid would be required to create adequate formation plugs at concentrations of less than about 0.12 pound per gallon.

Concentrations of bridging agent greater than about three pounds per gallon not pumpable through pumping equipment available at the average wellhead and are, therefore, not useful in the present invention.

A second element of the diverting material of the present invention is the carrier liquid. The carrier liquid must be one in which the bridging agent can be dispersed without solubilizing during the diverting operations. The carrier liquid may be a liquid with which the formation is being treated; for example, an aqueous fracturing liquid or an aqueous acid solution. The carrier liquid may not be one in which the bridging agent is too rapidly soluble or with which the bridging agent is reactive.

Therefore, the carrier liquid may be water or an acid solution, including water or acids gelled with polymers such as gums, celluloses, polysaccharides, polyacrylamides, or water or acid solutions emulsified with low concentrations of hydrocarbon phase. The water may have any pH and may contain other elements in addition to the bridging agent which will not react detrimentally with the bridging agent or the carrier liquid. For example, the water or acid may be gelled with any of the gelling agents commonly used for that purpose, i.e., hydratable polysaccharides. Surfactants ordinarily used in treating operations will lower surface tensions and interfacial tensions of the carrier fluid to greatly increase the efficiency of mixing operations.

The carrier liquid may not be a hydrocarbon liquid, such as oil based fracturing fluids, because it is a requirement of the diverting agent that it be soluble in hydrocarbon liquids. However, an emulsion with a high concentration of aqueous base phase and a low concentration of hydrocarbon phase may be usable.

The bridging agent may be added to the carrier treating fluid continuously as the treating fluid is pumped into the well bore, or it may be added at intervals in a carrier liquid between stages of the treatment. For example, in acidizing procedures the bridging agent may be added to the acidizing fluid continuously. Thus, the diverting agent will progressively plug portions of the formation being treated, thereby frustrating the tendency of the acid to flow only into the most permeable portions of the formation and, instead, creating an evenly acidized formation. When the treating fluid is pumped in stages, the first stage is followed by a volume of diverting material composed of a carrier fluid, usually gelled or emulsified water or acid, containing a bridging agent. The diverting agent seals off the portion of the formation penetrated by the first stage of treating fluid. The second stage of treating fluid is then pumped into another portion of the formation. Alternating volumes of treating fluid and diverting material may be continued to provide a uniformly acidized formation.

Although the same technique of continuously introducing the bridging agent into the carrier fluid may be used for fracturing treatments, it is usual for the diverting agent to be added to the carrier fluid in slugs during fracturing operations.

The fracturing liquid is known to preferentially flow into the portion of the subterranean formation which most readily accepts the liquid. After this portion of the formation is fractured, the bridging agent may be added to the fracturing fluid so that it will plug the already-fractured portion to the formation. Because the fracturing fluid is preferentially flowing into the fractured zone, it will carry the bridging agent with it. The fractured zone is thereby plugged and the fracturing fluid is diverted to the next most permeable portion of the formation.

This method of fracturing and diverting may be repeated to obtain multiple fractures.

The bridging agent of the present invention may also be described by the various characteristics it exhibits when in use. Said bridging agent is oil soluble at formation temperatures. Formation temperatures are generally above about 60°F and are usually found to be from about 80°F to about 250°F. If the bridging agent were not soluble at temperatures above about 60°F, it would be permanently deposited in the subterranean formation, decreasing the efficiency of the treating operation and possibly decreasing productivity.

The bridging agent of the present invention has a high melting point. the bridging agent should melt at temperatures higher than the formation temperatures. It is important to the operation of the bridging agent that it be removed from the formation by being dissolved by the oil in the formation rather than by being melted by the formation heat. Because many oil-bearing formations have temperatures of about 200°F or greater, it is important that the bridging agent does not melt or soften at temperatures of less than about 200°F.

It is further descriptive of the present invention that the bridging agent be able to plug formations so that the plugged formation is impermeable to liquids at pressures up to about 1,000 PSI at formation temperatures of about 300°F.

It is also descriptive of the present invention that the bridging agent is not soluble in water or acid. The bridging agent is placed in the formation in a carrier fluid of water or acid, and its effectiveness would be lost if it were dissolved in the carrier fluid. The bridging agent is used in water base fracturing fluids and is also used to direct acid to various parts of a formation during acid treatments. The need for the bridging agent to be insoluble in acid or water can be readily seen.

The following are examples of the bridging agent of the present invention and are intended only to further describe certain aspects of said agent. The examples are given primarily for the purpose of illustration; and the invention, in its broader aspects, is not to be construed as limited thereto.

EXAMPLE I

The bridging agent of the present invention is tested to determine whether it is soluble in hydrocarbon fluids at formation temperatures. Unibeads (wax), TLC-80 (benzoic acid), and other commonly used diverting agents are also tested for the same purpose.

Thirty-six grams each of Unibeads and of the bridging agent of the present invention (alkyl aromatic hydrocarbon resin) and 12 grams of TLC-80 are placed in each of two sets of 100 milliliter samples of crude oil, distillate and refined (MC-250) oil. One set of samples is heated to 125°F and the second set maintained at 75°F. The bridging agent samples are stirred in the hydrocarbon liquids with a magnetic stirrer for 1 hour after which the residue, if any, is measured to determine the amount of bridging agent which dissolved. The dissolved amounts are recorded in pounds per gallon in Table I, below. (No solubility test was made in crude oil at 75°F.)

Table I indicates the bridging agent of the present invention will dissolve in hydrocarbon liquids at formation temperatures and that the instant bridging agent compares favorably against Unibeads and TLC-80.

TABLE I

Pounds Bridging Agent Dissolved per Barrel of Oil

| Type Oil | Unibeads | | Present Invention | | TLC-80 | |
|---|---|---|---|---|---|---|
| | 75°F | 125°F | 75°F | 125°F | 75°F | 125°F |
| Crude | — | 125* | — | 115 | — | 18 |
| Distillate | 28 | 126* | 126 | 126 | 7 | 15 |
| Refined (MC-250) | 2 | 112* | 69 | 69 | 4 | 21 11 |

*Solution containing dissolved material solidified on cooling.
—No tests made.

Distilled water is gelled with guar gum by adding 200 pounds of the gelling agent per 1,000 gallons of distilled water. One pound per gallon of graded particular dicyclopentadiene is then added to the gelled water.

Four samples of the gelled water (samples A–D) containing the bridging agent are then passed at 50 PSI through a ⅜-inch perforation-like opening into an API BB bed at temperatures ranging from 200°F to about 300°F. The amount of gelled water which passed through the BB bed before the bridging agent forms a bridge sufficient to stop the flow of gelled water is observed.

In three samples (A–C), the pressure against the bridge is then increased until the bridge fails. The pressure at which the bridge fails is observed. In sample D, after the pressure against the bridge was increased to 400 PSI, the gelled water was removed, and the bridge was contacted with kerosene to determine whether the bridging agent forming the bridge would dissolve. The test results are shown in Table II, below.

TABLE II

| Sample | Temperature (°F) | Milliliters To Bridge | PSI at Bridge Failure |
|---|---|---|---|
| A | 200 | 250 | 650 |
| B | 250 | 200 | 675 |
| C | 300 | 200 | 725 |
| D | 300 | 200 | Held to 400 PSI* |

*Perforation open to flow 15 minutes after bridge was contacted with kerosene.

The test results in Table II indicate the bridging agent of the present invention will operate effectively at temperatures up to at least about 300°F and that a bridge formed by the bridging agent will dissolve upon contact with a hydrocarbon liquid.

EXAMPLE III

Bridging tests are conducted using 76°F water gelled with guar gum at a concentration of about 100 pounds per 1,000 gallons of water. The specific gravity of the water is adjusted to prevent the diverting agent from settling out.

Seven samples, A–G, of various bridging agents, including the bridging agent of the present invention, are placed in the gelled water at a concentration of about 2 pounds of bridging agent per gallon of water.

The gelled water samples containing the bridging agents are passed through seven laboratory fractures of widths varying from 0.10-inch to 0.40-inch. The pressure to which the bridge held before failing in each fracture width is observed. The observations from the test are recorded in Table III, below.

TABLE III

| Fracture width | Pressure held (p.s.i.) | | | | | | |
|---|---|---|---|---|---|---|---|
| | 0.10 | 0.13 | 0.16 | 0.20 | 0.24 | 0.32 | 0.40 |
| Rock salt | 1,000 | 1,000 | 1,000 | 1,000 | 1,000 | 385 | (¹) |
| Napthalene (graded) | 1,000 | 680 | 685 | 635 | 485 | (¹) | (¹) |
| Present invention | 1,100 | 800 | 600 | 550 | 200 | 130 | (¹) |
| Unibeads (wax) | 340 | 290 | 234 | 129 | 65 | 40 | (¹) |
| Napthalene (reg.*) | 0 | 0 | 0 | 0 | 0 | 0 | |
| Paraformaldehyde | 0 | 0 | 0 | (¹) | (¹) | (¹) | (¹) |
| Benzoic acid | 0 | 0 | (¹) | (¹) | (¹) | (¹) | (¹) |

¹ No bridge.

*These materials bridged the fracture widths shown to have zero (0) pressure buildup but did not seal. Field operations at higher pump rates than can be achieved in the laboratory have shown that these materials will achieve some fluid control. However, they are not expected to be nearly as effective as rock salt, napthalene (graded), the present invention or Unibeads (wax).

Table III indicates the bridging agent of the present invention forms a bridge exceeded in strength only by that formed by rock salt and napthalene. However, the rock salt will not dissolve in kerosene, indicating the pressure of water is necessary to remove it from the formation; and the napthalene is known to temperatures at temperature of about 180°F.

EXAMPLE IV

The solubility of dicyclopentadiene is observed by placing 18 grams in 50 milliliters of oil. The oil-dicyclopentadiene mixture is stirred for one hour at 76°F with a magnetic stirrer. The undissolved dicyclopentadiene is weighed to determine the amount taken into solution. Solubility is then calculated in pounds per barrel. The solubility of dicyclopentadiene in 21 oils, including 18 different crude oils, is observed. The results, shown in Table IV below, indicate dicyclopentadiene has a solubility in crude oil of greater than about 102 pounds per barrel.

TABLE IV

| Oil | Dicyclopentadiene Solubility (lbs./bbl.) |
|---|---|
| Oil Creek (Gainesville, Texas) | Crude oil 113 |
| Oil Creek (Garvin County, Texas) | Crude Oil 104 |
| Fredricksburg | Crude Oil 112 |
| Means | Crude Oil 104 |
| Anadarko | Crude oil 102 |
| Injun | Crude oil 109 |
| Pennsylvania | Crude oil 102 |
| Tuscaloosa | Crude oil 118 |
| Pauluxy | Crude Oil 116 |
| Tensleep | Crude Oil 115 |
| Smackover | Crude Oil 118 |
| Glenrose | Crude Oil 109 |
| Morrow | Crude Oil 106 |
| Redfork | Crude oil 116 |
| Citronelle | Crude oil 113 |
| Cardium | Crude oil 117 |
| Chalk | Crude oil 117 |
| Ellenberger | Crude oil 115 |
| Kerosene | >126 |
| Distillate (90°F) | >126 |
| Refined oil (90°F) | 69 |

EXAMPLE V

Three field tests are run to determine the usefulness of the diverting agent of the present invention using various carrier fluids and using both an intermittent and constant application of said diverting agent.

TEST I

A 15,624-foot deep well in the Smackover formation in Mississippi is treated with an acid solution which comprises 15 percent hydrochloric acid and 10 percent acetic acid in water. A surfactant is added to the acid. Graded particular dicyclopentadiene is added continually to the acid solution at a concentration of about 0.25 pounds dicyclopentadiene per gallon of acid solution as said solution is pumped into the formation, the acid solution being the carrier fluid. Seven thousand gallons of the acid solution containing the dicyclopentadiene is pumped into the formation until the formation is bridged and flow is stopped at a pressure of about 6,300 PSI. It is observed that the aqueous acid solution is an acceptable carrier fluid for the dicyclopentadiene and that the method of adding the bridging agent continually to the carrier fluid during the acid treatment is an effective method.

TEST II

A 14,633-foot deep well in the Smackover formation in Mississippi is treated with an acid solution comprising 15 percent hydrochloric acid and 10 percent acetic acid is an aqueous solution. A surfactant is added to the solution. Five thousand gallons of the acid solution is pumped into the formation. Then 8,000 gallons of the acid solution containing 0.25 pounds per gallon graded particular dicyclopentadiene is pumped into the formation, the acid solution being the carrier fluid. As the dicyclopentadiene-acid solution is pumped, the pressure on the formation is observed to increase from about 5,200 PSI to about 5,800 PSI, indicating the diverting agent is effective. Following the dicyclopentadiene-acid solution, about 2,000 gallons of the acid solution is pumped into the formation. It is observed that said acid solution is an effective carrier fluid for the dicyclopentadiene and that the method of using the diverting agent of the present invention between and during acid treatments is an effective method.

TEST III

A 9,414-foot deep well in North Dakota is treated with an aqueous acid solution comprising 28 percent hydrochloric acid in water. The treatment is run in stages as follows.

First Stage

Three thousand gallons of said acid solution is pumped into the formation followed by 350 gallons of salt water gelled with guar gum and containing about 2 pounds per gallon graded particular dicyclopentadiene. During the pumping of the salt water-dicyclopentadiene solution, it is observed that the pressure on the formation increases from about 2,400 PSI to about 3,000 PSI, indicating that diverting agent is effective.

Second Stage

A treatment similar to the first stage is accomplished, and it is observed that the pressure on the formation increases from about 2,800 PSI to about 3,000 PSI, indicating the diverting agent is effective.

Third Stage

A treatment similar to the first steps is again accomplished, and it is observed that the pressure on the formation increases from about 2,900 PSI to about 3,200 PSI, indicating the diverting agent is effective.

It is observed that gelled salt water is an effective carrier fluid for the graded particular dicyclopentadiene and that the method of applying the diverting agent of the present invention between other treatment liquids is an effective method.

It will be apparent that many widely different embodiments of this invention may be made without departing from the spirit and scope thereof, and, therefore, it is not intended to be limited except as indicated in the appended claims.

What is claimed is:

1. A diverting material for diverting aqueous oil well treating liquids to progressively less permeable portions of a subterranean formation, which comprises:
   a. an aqueous carrier liquid having dispersed therein in graded particulate form
   b. an oil soluble, cyclic or straight chain hydrocarbon resin having from about 20 to about 1,400 carbon atoms and a melting point of at least about 200°F, wherein said resin has a particle size distribution in the range of about 3 to about 200 mesh (U.S. Sieve Series) and is present in said carrier liquid in a concentration in the range of about 0.12 to about 3.0 pounds per gallon.

2. The diverting material of claim 1 wherein about 7 percent by weight of said resin present does not pass through size 4 mesh (U.S. Sieve Series), about 12 percent by weight of said resin present does pass through size 170 mesh (U.S. Sieve Series), and the weight balance of said resin varies in size between about 4 and about 170 mesh.

3. The diverting material of claim 2 wherein said aqueous carrier liquid is selected from the group consisting of water, aqueous acid solutions, hydrocarbon-in-water emulsions, water gelled with gums, cellulose, polysaccharides, and polyacrylamides, and acids gelled with gums, cellulose, polysaccharides, and polyacrylamides.

4. The diverting material of claim 2 further characterized by the addition of a surfactant to the carrier liquid.

5. The diverting material of claim 2 wherein said resin is present in said carrier liquid in a concentration of from about 0.25 to about 2.00 pounds per gallon.

6. The diverting material of claim 2 wherein said resin is selected from the group consisting of alkyl aromatic resins, indene-methyl indene polymers, pentaerythritol ester of polymerized rosin and pentaerythritol ester of dimeric resin acids.

7. The diverting material of claim 6 wherein said resin is dicyclopentadiene.

8. The method of diverting aqueous oil well treating fluids to less permeable portions of a subterranean formation, which comprises the steps of:
   pumping into said formation a diverting material which comprises
   a. an aqueous carrier liquid having dispersed therein in graded particulate form
   b. an oil soluble, cyclic or straight-chain hydrocarbon resin having from about 20 to about 1,400 carbon atoms and a melting point of at least about 200°F, wherein said resin has a particle size distribution in the range of about 3 to about 200 mesh (U.S. Sieve Series) and is present in said carrier liquid in a concentration in the range of about 0.12 to about 3.0 pounds per gallon, whereby said resin bridges across and seals the most porous portions of said formation, diverting the flow of treating fluid to less permeable portions of said formation.

9. The method of claim 8 wherein about 7 percent by weight of said resin present does not pass through size 4 mesh (U.S. Sieve Series), about 12 percent by weight of said resin present does pass through size 170 mesh (U.S. Sieve Series), and the weight balance of said resin varies in size between about 4 and about 170 mesh.

10. The method of claim 9 wherein said aqueous carrier liquid is selected from the group consisting of water, aqueous acid solutions, hydrocarbon-in-water emulsions, water gelled with gums, cellulose, polysaccharides, and polyacrylamides, and acids gelled with gums, cellulose, polysaccharides, and polyacrylamides.

11. The method of claim 9 further characterized by the addition of a surfactant to the carrier liquid.

12. The method of claim 9 wherein said resin is present in said carrier liquid in a concentration of from about 0.25 to about 2.00 pounds per gallon.

13. The method of claim 9 wherein said resin is selected from the group consisting of alkyl aromatic resins, indenemethyl indene polymers, pentaerythritol ester of polymerized rosin and pentaerythritol ester of dimeric resin acids.

14. The method of claim 15 wherein said resin is dicyclopentadiene.

15. The method of claim 9 wherein the aqueous oil well treating fluid is the carrier liquid.

16. The method of claim 9 wherein the diverting agent is pumped continuously into the subterranean formation.

17. The method of claim 9 wherein the diverting agent is pumped intermittently into the subterranean formation.

* * * * *